United States Patent [19]
Williamson et al.

[11] Patent Number: 5,533,765
[45] Date of Patent: Jul. 9, 1996

[54] CRIMPED TUBE-TO-PORT HYDRAULIC FITTINGS

[75] Inventors: Nigel D. L. Williamson, Fort Wayne, Ind.; Warren J. Nichols, Adrian, Mich.

[73] Assignee: NWD International, Inc., Morenci, Mich.

[21] Appl. No.: 269,841

[22] Filed: Jul. 1, 1994

Related U.S. Application Data

[63] Continuation-in-part of Ser. No. 230,972, filed as PCT/US92/09035, Oct. 22, 1992, which is a continuation-in-part of Ser. No. 782,409, Oct. 25, 1991, abandoned.

[51] Int. Cl.$^6$ .................................................. F16L 13/14
[52] U.S. Cl. .................. 285/212; 29/511; 285/334.5; 285/382; 285/332; 285/190
[58] Field of Search .................. 285/332.2, 382, 285/332, 382.7, 334.5, 190, 203, 204, 215, 216, 231, 234, 227, 343; 29/505, 509, 510, 511

[56] References Cited

U.S. PATENT DOCUMENTS

| | | | |
|---|---|---|---|
| 1,515,248 | 11/1924 | Furber | 29/511 |
| 2,332,893 | 10/1943 | Clickner | 285/234 |
| 2,496,149 | 1/1950 | Cahenzli, Jr. | 285/126 |
| 2,657,077 | 10/1953 | Woodling | 285/334.5 |
| 2,687,906 | 8/1954 | Schnell | 285/334.5 |
| 2,826,438 | 3/1958 | Woodling | 285/342 |
| 2,942,895 | 6/1960 | Lyon | 285/212 |
| 3,003,795 | 10/1961 | Lyon | 285/212 |
| 3,145,035 | 8/1964 | Hanback | 285/110 |
| 3,151,893 | 10/1965 | Lyon | 285/158 |
| 3,151,896 | 10/1964 | Kody | 285/212 |
| 3,201,153 | 8/1965 | Currie | 285/249 |
| 3,219,366 | 11/1965 | Franck | 285/190 |
| 3,315,988 | 4/1967 | Schroter | 285/190 |
| 3,441,293 | 4/1969 | Bagnulo | 29/511 |

(List continued on next page.)

FOREIGN PATENT DOCUMENTS

| | | | |
|---|---|---|---|
| 250541 | 1/1961 | Australia | 285/234 |
| 276483 | 8/1988 | European Pat. Off. | 285/382 |
| 0412626A1 | 2/1991 | European Pat. Off. | F16L 13/16 |
| 1507625 | 11/1967 | France . | |
| 434908 | 10/1926 | Germany | 285/382 |
| 53477 | 1/1967 | Germany . | |
| 2610775 | 9/1977 | Germany | 285/190 |
| 3416702 | 11/1985 | Germany | F16L 13/14 |
| 4165191 | 6/1992 | Japan | 285/382 |
| 4341682 | 11/1992 | Japan | 285/382 |
| 5141580 | 6/1993 | Japan | 285/382 |
| 718264 | 11/1954 | United Kingdom . | |
| 1227037 | 3/1971 | United Kingdom . | |
| 2192247 | 1/1988 | United Kingdom | F16L 21/04 |
| 2205373 | 12/1988 | United Kingdom | F16L 21/02 |
| 2207722 | 2/1989 | United Kingdom . | |
| W093/08423 | 4/1993 | WIPO | F16L 19/02 |

*Primary Examiner*—Eric K. Nicholson
*Attorney, Agent, or Firm*—Baker & Daniels

[57] ABSTRACT

The present invention relates to an improved hydraulic coupling which forms contact seals to fluidly connect a tube to a tapered port by crimping (tube-to-port). The contact seal includes a metal-to-metal seal with a secondary elastomeric seal. A crimped collar of the port retains a compression ring in a metal-to-metal contact. Another embodiment of the invention provides a transverse fluid coupling for a tube with the port being part of the bolt/body assembly of a "banjo" coupling. The crimped collar of the present invention is removed from the contact seal so that flexural forces and vibration of the coupling can be better resisted. The port, tube, and compression ring define a pocket for the location of a sealing ring disposed in the pocket. The pocket has a cross-sectional area larger than the cross-sectional area of the sealing ring. The tube may include a lip having an outwardly facing tapered surface substantially complementary to the tapered surface of the port. The compression ring includes an internal angled seat contacting the tube. The compression ring also includes a reverse taper contacting the collar so that the reverse taper facilitates the collar retaining the compression ring into sealing contact with the tapered surface.

19 Claims, 7 Drawing Sheets

U.S. PATENT DOCUMENTS

| | | | |
|---|---|---|---|
| 3,451,110 | 6/1969 | Bray | 29/511 |
| 3,501,171 | 3/1970 | Baron | 285/334.5 |
| 3,560,028 | 2/1971 | Ohba | 285/332.2 |
| 3,615,160 | 10/1971 | Feather | 285/334.5 |
| 3,858,914 | 1/1975 | Karie et al. | 29/511 |
| 3,940,843 | 3/1976 | Yeager | 29/511 |
| 4,009,896 | 3/1977 | Brewer | 285/332 |
| 4,214,781 | 7/1980 | Joseph | 29/511 |
| 4,606,668 | 8/1986 | Schmidt | 29/511 |
| 4,693,502 | 9/1987 | Oetiker | 285/334.5 |
| 4,776,616 | 10/1988 | Umehara et al. | 285/382 |
| 4,848,448 | 7/1989 | Kaarre | 29/511 |
| 4,934,742 | 6/1990 | Williamson | 285/212 |
| 5,120,084 | 6/1992 | Hashimoto | 285/332 |
| 5,261,705 | 11/1993 | Takahashi et al. | 285/332 |

CRIMPED TUBE-TO-PORT HYDRAULIC FITTINGS

CROSS-REFERENCE TO RELATED APPLICATIONS

The present application is a continuation-in-part of U.S. patent application Ser. No. 08/230,972, filed Apr. 21, 1994, which is a continuation-in-part of International Patent Application No. PCT/US92/09035, filed Oct. 22, 1992, that designated the United States, now abandoned, which is a continuation-in-part of U.S. patent application Ser. No. 07/782,409, filed Oct. 25, 1991, now abandoned.

BACKGROUND OF THE INVENTION

1. Field of the Invention

The present invention relates to hydraulic couplings. More specifically, the field of the invention is that of hydraulic port fittings such as used in automobiles, aircraft, and the like.

2. Related Art

There are many port fittings on the marketplace currently which are designed to connect tubing or hydraulic hose to power equipment such as brake calipers etc. One of the most frequently used methods of attachment is the tube-to-port type fitting. The tube-to-port fitting is used in brake, power steering, and air conditioning systems.

The problem with conventional hydraulic couplings is that they are prone to leaks which are both expensive and dangerous. Warranty and in-house costs of fixing such leaks may become quite large, and the environmental consideration of the effects of such loss of contaminating fluids cannot be ignored.

Traditionally, the hydraulics supply industry has recommended better surface finishes and tighter tolerances in manufacture in order to minimize the potential for leaks. This has, however, failed to adequately answer the problem. To adequately address this problem, the causes of the leaks in two prior art port fittings must be examined.

Figure 1:
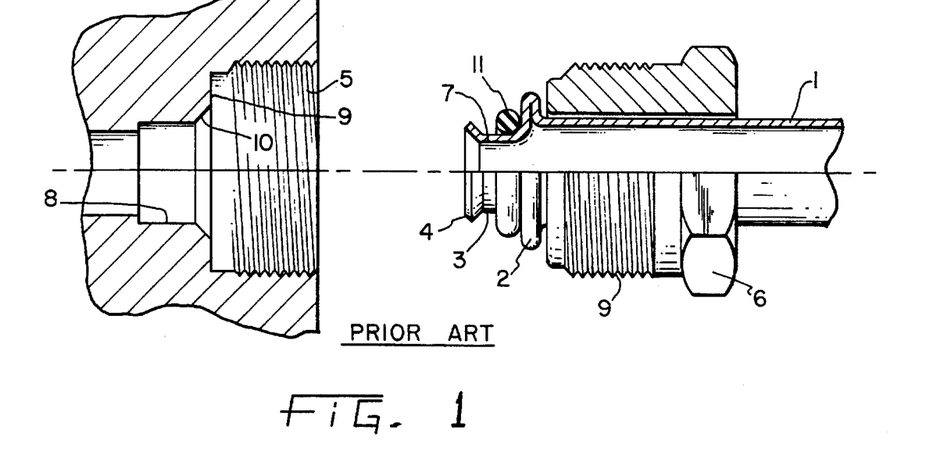
FIG. 1 is a side view, in partial cross section, of a prior art tube-to-port coupling before assembly.

The prior art tube-to-port fitting, as shown in FIG. 1, comprises a tube 1 which includes a raised bead 2 which sits behind reduced diameter portion 3. This diameter 3 is required to be of very smooth surface finish. Often, the tube-to-port fitting also includes an o-ring retention feature 4. The periphery of bead 2 is severely stressed during the formation process, and these stresses can lead to cracking, though proper specification of tubing composition may ameliorate this problem. However, specification of required chemical composition, heat treatment, hardness, wall thickness, or specific manufacturing methods for the tubing further adds to the expense of the fitting.

Tube 1 is assembled to a mating port 5 with tube nut 6. The port 5 has a very finely machined internal configuration which is required to have a fine surface finish in order to seal reliably.

Figure 2:
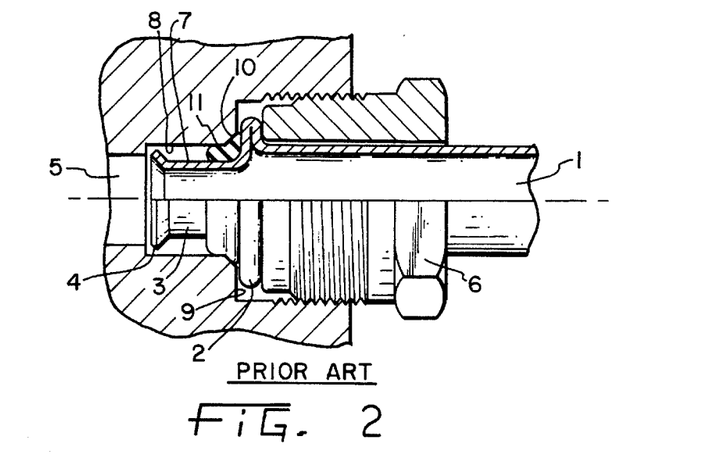
FIG. 2 is a side view, in partial cross section, of a prior art tube-to-port coupling assembled.

When assembled with the required o-ring 11, as in FIG. 2, the bead on the tube portion comes into tight axial abutment with the flat-faced feature 9 in the bottom of port 5. O-ring 11 is driven down taper 10 of port 5 and forms a seal in the tapered area and along a portion of the parallel interface between surfaces 7 and 8.

Figure 3:
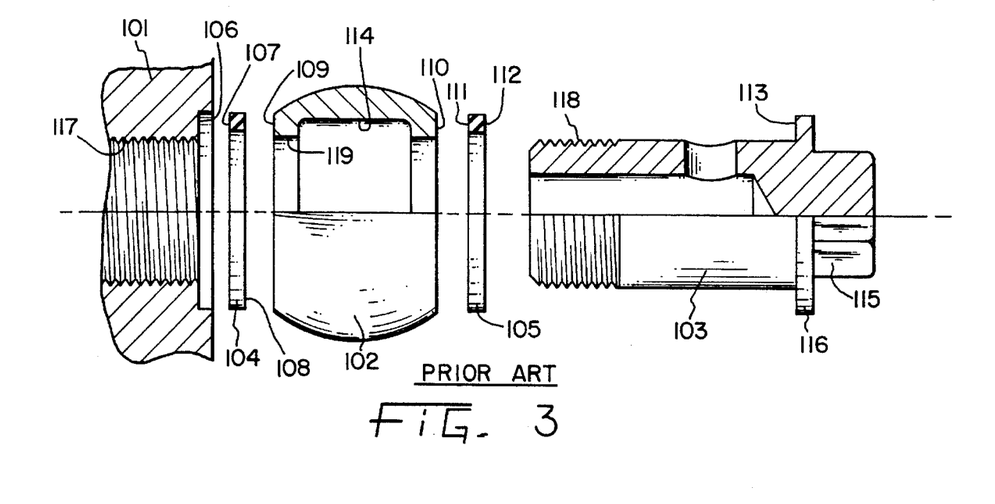
FIG. 3 is a side view, in partial cross section, of a prior art "banjo" coupling before assembly.
Figure 4:
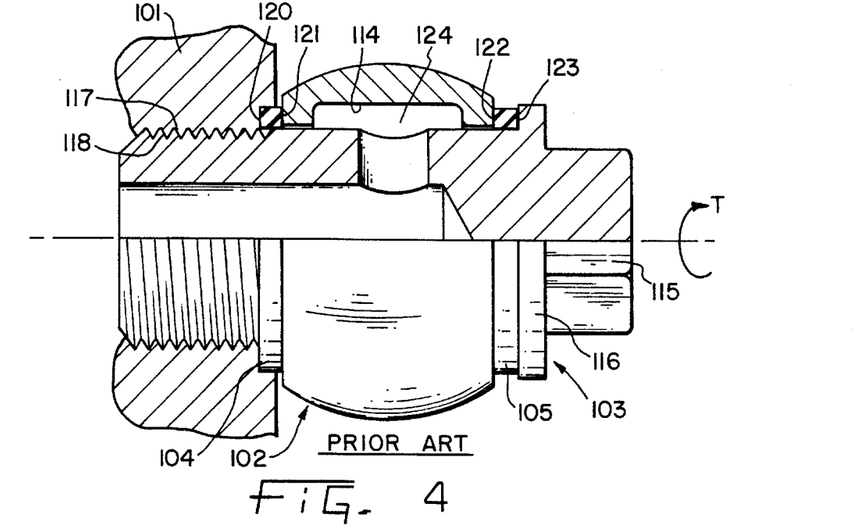
FIG. 4 is a side view, in partial cross section, of a prior art "banjo" coupling assembled.

The tube-to-port fitting may be part of a "banjo" type fitting. "Banjo" fittings are so termed because of their shape, which usually comprises of a tube brazed onto a round component, giving rise to a substantially banjo-shaped assembly. Referring to FIGS. 3 and 4, which show a prior art "banjo" fitting, a typical banjo fitting is comprised of body 102 through which bolt 103 is assembled. The combination of body 102 and bolt 103 is then assembled to port 101. Sealing of the body/bolt assembly is accomplished with copper (typically) washers 104 and 105, which are placed each side of body 102. Large torques (applied in the radial direction of arrow T of FIG. 4) are employed to obtain a seal between components, which sometimes cannot be sealed. A common failure of this assembly is to snap the bolt or strip the threads of the port while striving to attain sealing contact.

The "banjo" fittings are useful because of their inherent assembly benefits in situations where time taken to assemble and ease of access to components are important considerations. "Banjo" fittings are assembled from the front, and assembly can be effected with power tools. This is not true of other fittings which perform the function served by "banjo" fittings, that of supplying fluid to a component through a 90 degree change of direction or other similar reorientation of fluid flow. This change of fluid flow is accomplished by connecting a tube or similar fluid conduit at a transverse orientation relative to the axis of the bolt/body assembly. This transverse connection is often accomplished with a tube-to-port fitting.

A drawing of an assembled prior art "banjo" fitting is shown in FIG. 4, where body 102, shown in partial cut-away, is recessed internally to create flow chamber 124 for pressurized fluid. A recessing operation is required to be done to body 102, rather than in bolt 103, in order to retain as much tensile strength in bolt 103 as possible. If bolt 103 were reduced in diameter to create a flow chamber, insufficient material would remain in bolt 103 to withstand the massive assembly torques required to obtain a seal. The recessing operation required for body 102 is expensive and difficult to control. Also, bolt 103 must be made of relatively high tensile material in order to resist tensile failure due to high torques, and such materials are hard to machine which further complicates the manufacture of prior art "banjo" fittings.

One problem with prior art "banjo" fittings involves the four potential leak-paths in any standard banjo fitting, one on each side of the metal washers 104 and 105 which are located at sealing points 120, 121, 122 and 123 of FIG. 4. Also a problem is that massive torques are required to attain a seal, which in turn, requires a high tensile strength bolt, and an internally recessed body. These are expensive requirements for the manufacture of the "banjo" fitting.

An additional problem involves the lack of any secondary seal in the port interface. Should one of the four metal-to-metal interfaces develop a leak, the only way of overcoming it is to impart greater torque to the assembly. This regularly leads to tensile failures of bolts or stripped threads on bolts or in ports.

Further problems involve shape, size and alignment of the prior art "banjo" fittings. Flow characteristics within the fitting are primarily derived from consideration of tensile strengths rather than from system demand. This often leads to flow restrictions which are not desirable. Also, the face-to-face association of components requires close control in order to form an adequate seal. Concentricity and squareness of through-bores on bodies must be carefully maintained in production, and aligned accurately during assembly, if a seal is to be obtained.

Although not immediately apparent why a coupling of this design should be the source of so many leaks, detailed analysis reveals that the interface is not ideal for reliable long-term service. The following paragraphs describe problems inherent in the prior art hydraulic couplings.

One problem involves the abutment of tube bead with flat-bottomed base of the port which is essentially face-to-face, wherein the bead is put into a plastic deformation by the pressure exerted by the tube nut. There is very little elastic resiliency in the interface. Once the metal of the tube takes a set after assembly, subsequent pressurization forces, vibration, flexure, heating and cooling, etc. may give rise to a gap which will only worsen over time.

Another problem involves the orientation of the o-ring. Positioned in both the tapered area and the parallel interface, the o-ring is deformed during the assembly operation into a kidney-like shape, with a portion remaining in the relatively large tapered portion of the port. When the o-ring takes a set over time, it will be incapable of movement within the pocket, being trapped by the tapered portion. In order for an o-ring to work properly, it must be capable of moving in response to pressure differentials. Therefore, the improper positioning of the o-ring in the port interface tends to prevent the o-ring from moving and thus degrades long term performance of the fitting.

An additional problem involves the fact that the only seal in the tube-to-port fitting is provided by the o-ring. Without the o-ring in place, the tube does not seal when assembled to the port, even against low pressures. Also, misalignment of components may result in a damaged o-ring, and with this frequent problem a leak will be immediately apparent.

A further problem exists in a situation where the tube-to-port fitting is used in air conditioning systems, due to the searching nature of refrigerants. O-rings are permeable to freon, especially under pressure. If the o-ring is the only seal in a system, a constant and irretrievable loss of refrigerant to the atmosphere occurs through the permeable o-ring. This loss is slow at first, due to the slowness of permeation through the o-ring, but it becomes more rapid as the o-ring takes a set over time, and larger leak-paths occur.

In order to alleviate the aforementioned problems with prior art banjo fittings, the transverse tubing of the banjo is conventionally connected by brazing. The brazing operation requires that the complete banjo assembly, including the transverse tube, be put in the brazing furnace. As the transverse tube is several time larger than the other banjo components, brazing the tube requires much more room inside the brazing furnace. The increased amount of furnace space needed increases the manufacturing cost of the banjo assembly. Also, since coatings such as zinc plating tend to flash off in the brazing furnace, the components must be assembled and brazed in their uncoated condition. This requires that the banjo assembly be coated subsequent to the brazing operation to provide a corrosion resistant assembly. Requiring these two processing steps greatly increases the cost of manufacture of the banjo, often doubling or tripling the cost of the banjo components themselves.

What is needed is an improved hydraulic coupling which utilizes the elastic properties of the materials.

Also needed is an improved hydraulic coupling which does not excessively deform o-rings in the coupling.

A further need is for an improved hydraulic coupling which includes secondary seals.

An additional need exists for an improved hydraulic coupling for refrigerant systems which includes metal-to-metal seals.

A further need exists for an improved hydraulic coupling which minimizes the number of potential leak paths.

Yet another need exists for an improved hydraulic coupling which requires less processing during manufacture.

SUMMARY OF THE INVENTION

The present invention involves a crimped tube-to-port fitting which creates a metal-to-metal primary seal and allows for an elastomeric secondary seal. This avoids the necessity of forming threads or performing a brazing operation while providing a highly leak resistant hydraulic coupling. Also, the present invention allows the fitting components to be coated for corrosion resistance previous to assembly of the components. A compression ring is forced into sealing contact with the surface of the port by crimping a collar of the port, driving the ring into the interface. The crimped tube-to-port fitting may also be utilized for connecting the tube to the bolt/body assembly of a banjo fitting.

The elastic deformation of mating components is preferred because the elastic memory of the material (either metal or rubber and the like) imparts a continuous sealing force. In comparison, plastic deformation of the material, which permanently deforms the fitting components, imparts no additional sealing force. Both metals and rubber type materials are subject to both forms of deformation, as metal material may be plastically deformed by high torque when assembled while elastic materials may be plasticly deformed by setting over time.

Embodiments of the present invention impart multiple seals to the port interface, and use elastic memory of metallic components in the interface where possible. This is attained by the use of elastic components in those instances where such is possible or desireable in conjunction with abutting tapered metallic surfaces which allow for the generation of an interface the integrity of which is enhanced by elastic memory. With ports made of softer materials, a metallic component having a complementary taper or a resin polymer component may be used to create a contact seal of similar integrity. The acute tapered metallic surfaces provides a high unit loading which ameliorates the need for the expensive materials needed for receiving the high torques required with prior art fitting components.

The present invention specifically addresses the need for a hydraulic coupling utilizing components capable of being pre-coated prior to assembly. The resulting interface between the tube and the port resists the vibration, heating and cooling cycles, pressure pulses, flexure, and other operating conditions of the brake, power steering, and air conditioning systems used by the automotive industries. The fitting of the present invention includes multiple seals in the interface, each having different characteristics in order to seal in both low and high pressures under aggressively destructive conditions. Also, the present invention may be efficiently and economically implemented.

The present invention utilizes tapered surfaces at its interfaces to invoke the elastic memory of the components of the assembly, and using metal-to-metal seals with elastomeric seals. The inventive fitting requires associative forces to create the necessary seal between the metal surfaces. The present invention utilizes the crimp collar as the component part for applying the required associative forces. The assembly force is created by the use of a press which rolls, coins, swedges, or otherwise deforms the collar over the assembled components, capturing all the components in their assembled condition. The elastomeric seals are placed within a pocket of larger cross-sectional area than that of the elastomer seal itself so as not to interfere with the metalto-metal seals. The crimp collar also provides a separation of the point of application of the associative forces from the sealing surfaces in order to offer better resistance to flexural forces and vibration. The resulting design may be easily translated to a variety of sizes of tubing and fitting components for use in many hydraulic fields.

One object of the present invention is to provide an improved hydraulic coupling which utilizes the elastic properties of the materials.

Also an object is to provide an improved hydraulic coupling which does not excessively deform sealing rings in the coupling.

A further object is to provide an improved hydraulic coupling which includes secondary seals.

An additional object is to provide an improved hydraulic coupling for refrigerant systems which includes metal-to-metal seals.

A still further object is to provide an improved hydraulic coupling which minimizes the number of potential leak paths.

Yet another object is to provide an improved hydraulic coupling which requires less torque for assembly.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENTS

The preferred embodiments disclosed below are not intended to be exhaustive or limit the invention to the precise form disclosed in the following detailed description. Rather, the embodiments are chosen and described so that others skilled in the art may utilize their teachings. The present invention relates to hydraulic couplings, and particularly to couplings which utilize the elastic properties of materials, for example metals or o-rings, to form sealing contact between mating components.

Figure 5:
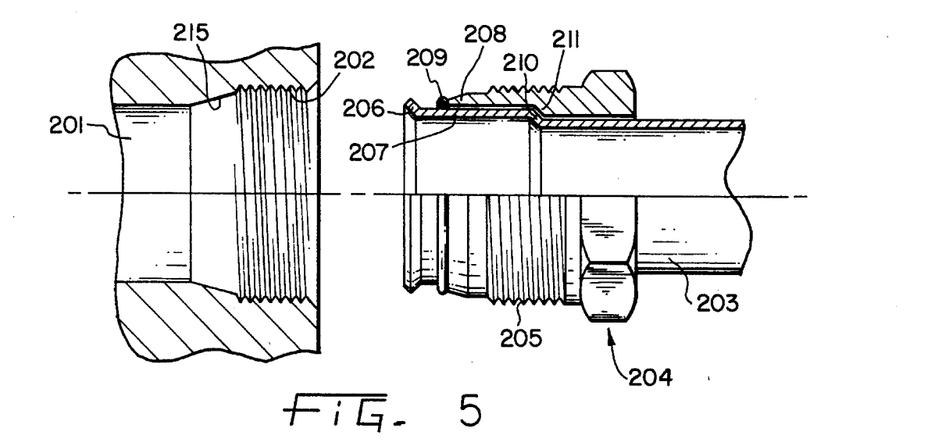
FIG. 5 is a side view, in partial cross section, of a tube-to-port coupling before assembly.
Figure 6:
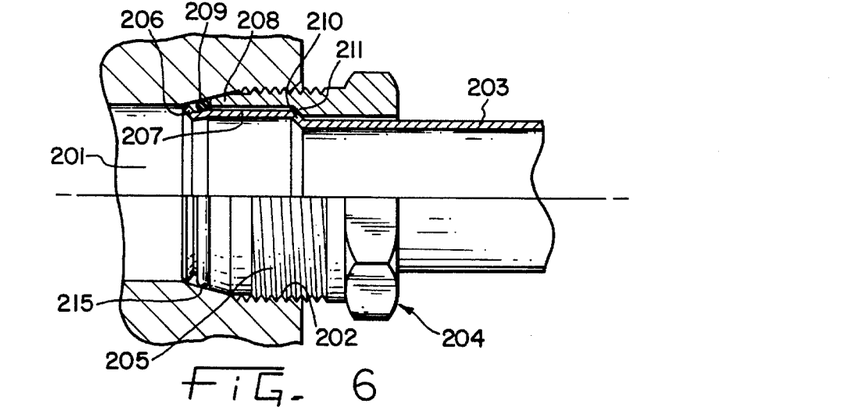
FIG. 6 is a side view, in partial cross section, of the tube-to-port coupling of FIG. 5 assembled.
Figure 7:
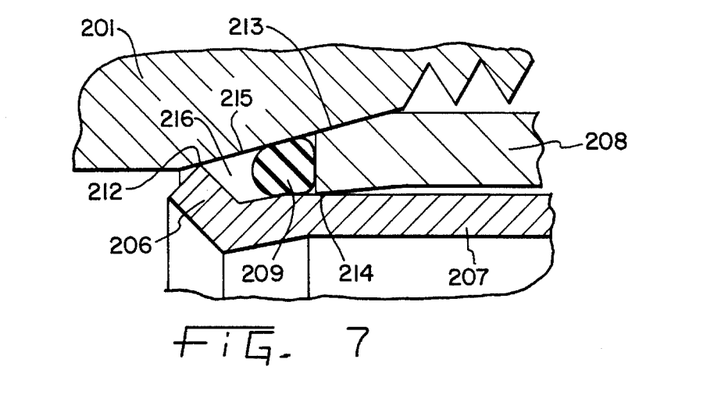
FIG. 7 is an enlarged sectional view of the abutting portions of the port, nut, and tube of FIG. 6.

One embodiment of a tube-to-port coupling is shown in FIGS. 5–7. Port body 201 contains an internally defined passageway for fluid communication, and has internal threads 202 for engaging tube nut 204. Tube nut 204 is disposed over expanded portion 207 of tube 203 and includes an end having a relatively thin wall or rim 208. Also, shoulder portion 211 of nut 204 abuts transition portion 210 of tube 203. Thin wall 208 may include a taper to match tapered surface 215 of port 201, although such a taper is not necessary to practice the present invention. Thin wall 208 of nut 204 is designed to conform with tapered surface 215 at the bottom of port 201 during assembly, and impinges on the outside of expanded portion 207 of tube 203. Alternatively, o-ring 209 may be included for additional sealing security where desired. In many situations, o-rings are not acceptable components in hydraulic or gas systems, and the coupling functions properly either with or without o-ring 209. Where no such restriction on the use of o-rings exists, then the use of o-ring 209 will render the assembly even more reliable in the long term.

Tube nut 204 is connected to port 201 by the engagement of external threads 205 of nut 204 with internal threads 202 of port 201. When manually assembled, lip 206 on expanded portion 207 of tube 203 contacts tapered surface 215 ahead of any contact with o-ring 209. This ensures that there will be a visible leak from the assembly in the event that wrench tightening has not occurred. Upon the application of sufficient torque during wrench tightening of nut 204, shoulder portion 211 forces expanded portion 207 into port 201 causing lip 206 to contact and deform on tapered surface 215 creating a metal-to-metal interface between lip 206 and tapered surface 215 which itself seals against pressure. As wrench tightening continues, o-ring 209 is brought into contact with tapered surface 215, and finally, thin wall 208 of tube nut 204 contacts tapered surface 215. When final wrench tightening torque is applied, thin wall 208 of tube nut 204 conforms with tapered surface 215 in port 201, and is driven down into contact with expanded portion 207 of tube 203. The engagement of expanded portion 207 and nut 204 forms a second metal-to-metal seal as a back-up to the seal between lip 206 and tapered surface 215. 0-ring 209, which occupies the space between the metal-to-metal seals of the assembly, sits in pocket 216 so formed and constitutes a third seal in the assembly.

The three seal system shown in FIG. 7 is much more effective than the single elastic seal which exists with the prior art tube-to-port fitting. Referring to FIG. 7, seal 212 is formed between lip 206 and tapered surface 215, additional seals 213 and 214 are formed between thin wall 208 and both tapered surface 215 and expanded portion 207, respectively, and another seal is formed by o-ring 209. Additional benefits are also derived from the presence of metal-to-metal seals when used with air conditioning refrigerants which are capable of permeation through elastomeric seals. The existence of metal-to-metal seals prevents even the slightest permeation leaks, and, even if the metal seals failed, they would significantly slow the permeation rate of refrigerant through the interface.

The tube to port coupling of FIGS. 5–7 is assembled by inserting nut 204 into port 201 and threadably engaging threads 205 of nut 204 with threads 202 of port 201. Continuing to rotate nut 204, threads 205 and 202 engage until lip 206 contacts tapered surface 215. With manual or hand tightening of nut 204, o-ring 209 would not yet be in contact with tapered surface 215, and a leak would be apparent if pressurized fluid was introduced through the interface. By further tightening using a wrench, nut 204 may be rotated so that lip 206 is deformed on tapered surface 215. Also, optional o-ring 209 is positioned in sealing contact with tapered surface 215. With further wrench tightening, thin wall 208 comes into contact with tapered surface 215 and is thus deformed and forms a seal on tapered surface 215. Finally, thin wall 208 is urged inwardly until it is deformed into sealing contact with expanded portion 207. The torque required to deform lip 206 and bring nut 204 into sealing contact is relatively small in comparison to the torques required with prior art fittings because the narrow taper of surface 215 facilitates deformation of lip 206.

Additionally, with a shallow angle in the port, the unit loading of the mating components which is generated during assembly is exceptionally high, enhancing the potential for a reliable seal. The nature of a taper is such that elastic memory is invoked between mating tapered surfaces, thereby ensuring long-term integrity of the interface, even under the most aggressive influences such as vibration, heating and cooling, impulse, flexure, etc.

In one form of the coupling, tube 203 initially has an outer diameter which is greater than the inner diameter of nut 204. The coupling is formed by first compacting an end of the tube and placing the nut on the compacted portion. Next, the compacted tube end is again expanded to an extent so that the nut is captured on the tube, and the lip is formed. The difference between the compacted portion and the outside diameter of the tube may be as little as a few thousandths of an inch, however, this differential is sufficient to capture the nut. The differential between the outer diameter of the tube and the outer diameter of the compacted portion of the tube is in the range of 0.010 inches to 0.050 inches, more particularly in the range of 0.015 inches to 0.030 inches, and specifically about 0.020 inches.

A transverse hydraulic coupling, which resulted from consideration of the same requirements, includes a tapered metal-to-metal interface backed up by optional o-rings which are shown in FIGS. 8–11. The transverse coupling comprises port 301, body 304, and bolt 309. Port 301 has internal threads 302 and a tapered surface 303 into which fits external taper 305 of body 304. Body 304 defines axial passageway 306 which is in fluid communication with port 301, and includes annular surface 308 facing port 301. At the distal end of body 304 is an internal taper 307 which mates with external taper 319 on the bolt 309. Bolt 309 has surfaces 311 and 317 which may support optional o-rings 322 and 323 in pockets 327 and 328, respectively. Pocket 327 is defined between surface 311, tapered surface 303, and annular surfaces 312 and 308 of bolt 309 and body 304, respectively. Pocket 328 is defined between extension 316, surface 317, annular surface 318, and tapered surface 307.

Figure 8:
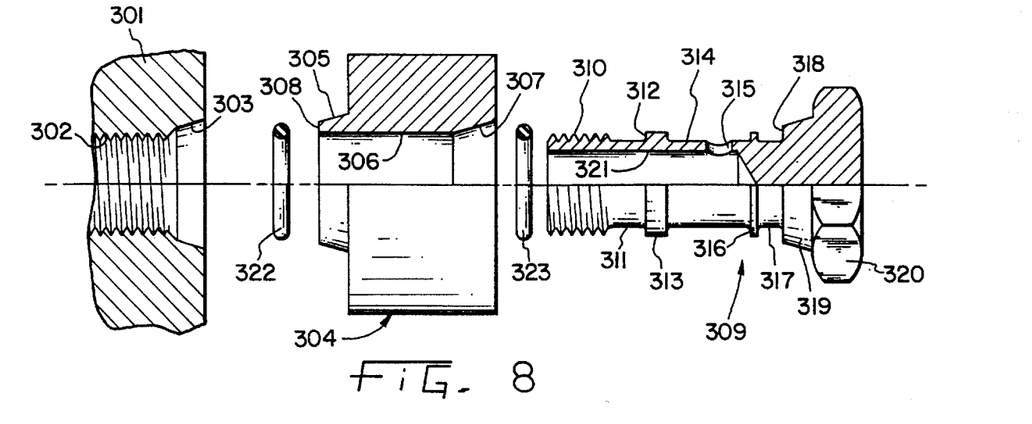
FIG. 8 is a side view, in partial cross-section, of a transverse hydraulic coupling before assembly.

During assembly, if o-rings are desired then o-ring 323 is first placed on surface 317. Bolt 309 is then assembled into body 304 and o-ring 322 is placed on surface 311. In the situation where o-rings 322 and 323 are used, which will be in the majority of cases, the fitting formed by bolt 309 and body 304 is held together by o-ring 323, which is an advantage during final attachment to port 301.

Figure 9:
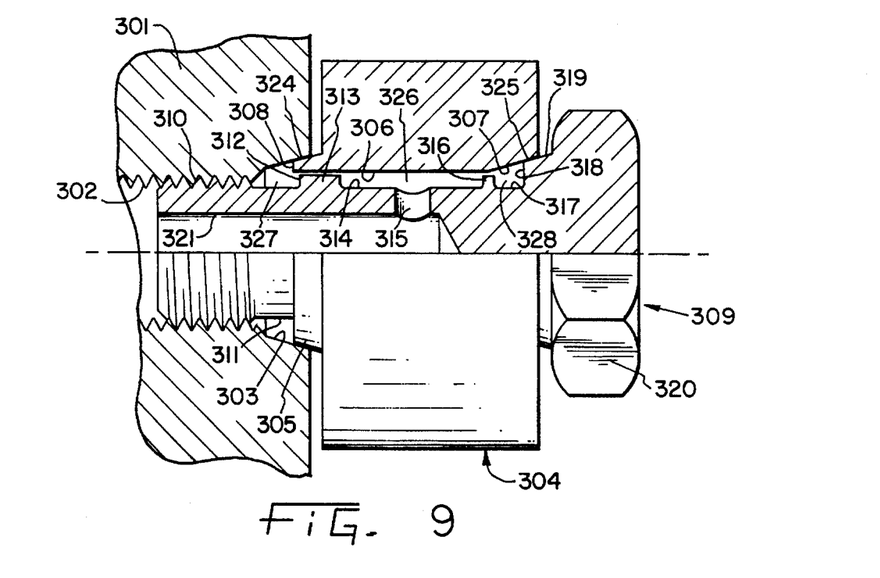
FIG. 9 is a side view, in partial cross-section, of the coupling of FIG. 8 assembled without o-rings.
Figure 10:
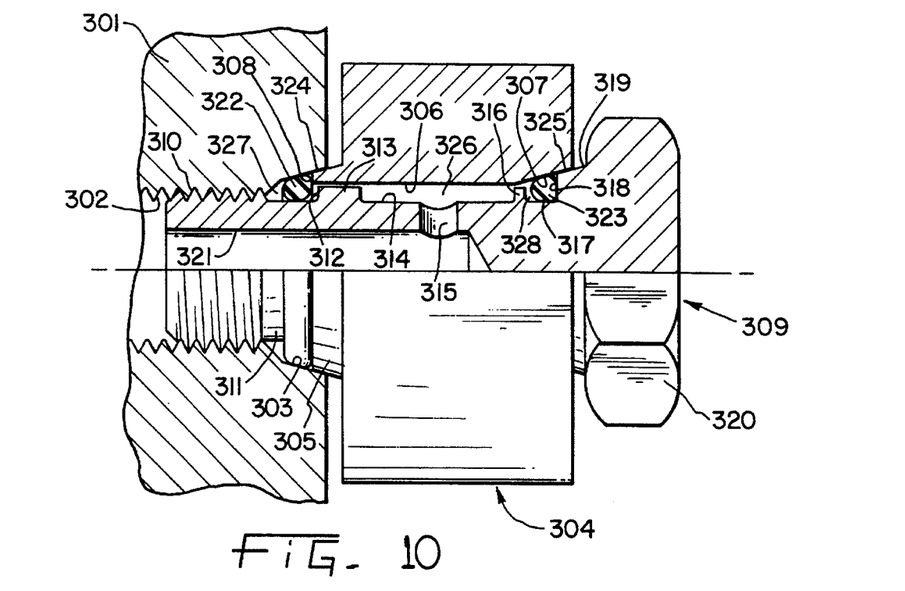
FIG. 10 is a side view, in partial cross-section of the coupling of FIG. 8 assembled with o-rings.

Once bolt 309 is assembled through body 304, the bolt/body combination is then assembled to port 301 by engagement of threads 310 of bolt 309 with threads 302 of port 301. As torque is applied to hex head 320 of bolt 309, the mating tapers of bolt-to-body and of body-to-port create very high unit loading and invoke elastic memory between mating parts. The net result of the mating tapers is a coupling which seals at relatively low torques and, due to the elasticity in the interface, remains sealed over considerable time. Referring to FIG. 9, seals are formed at locations 324 and 325 which provide such an elastic interface. When o-rings 322 and 323 are used (see FIG. 10), the reliability of the system is enhanced considerably.

Figure 11:
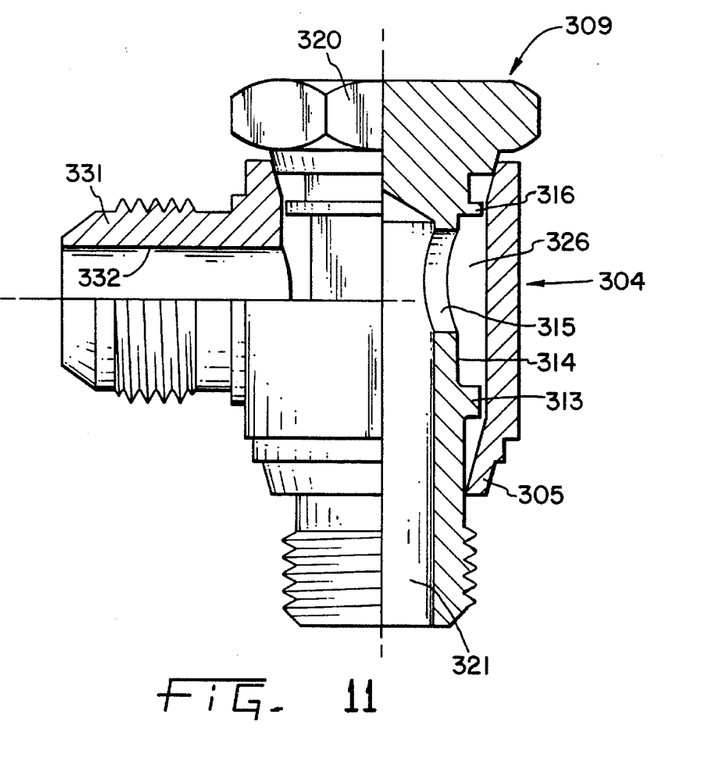
FIG. 11 is a side view, in partial cross-section, of the coupling of FIG. 8 showing a transverse passageway.

The internal fluid conduit provided by body 304 is defined by internal cylindrical wall 306 and bolt 309. Specifically, the conduit includes chamber 326, aperture 315, and bore 321. Chamber 326 is defined by wall 306 and outer surface 314 of bolt 309, and also may be further defined by extensions 313 and 316 of bolt 309. Bore 321 is in fluid communication with chamber 326 by virtue of aperture 315 which is located on outer surface 314. Referring to FIG. 11, another passageway 332, which is transverse to bore 321, is defined by arm 331 of body 309. Passageway 332 is in fluid communication with chamber 326 to thereby provide a fluid conduit for flow from a tube, or other device which may be attached to arm 331, to port 301.

Figure 12:
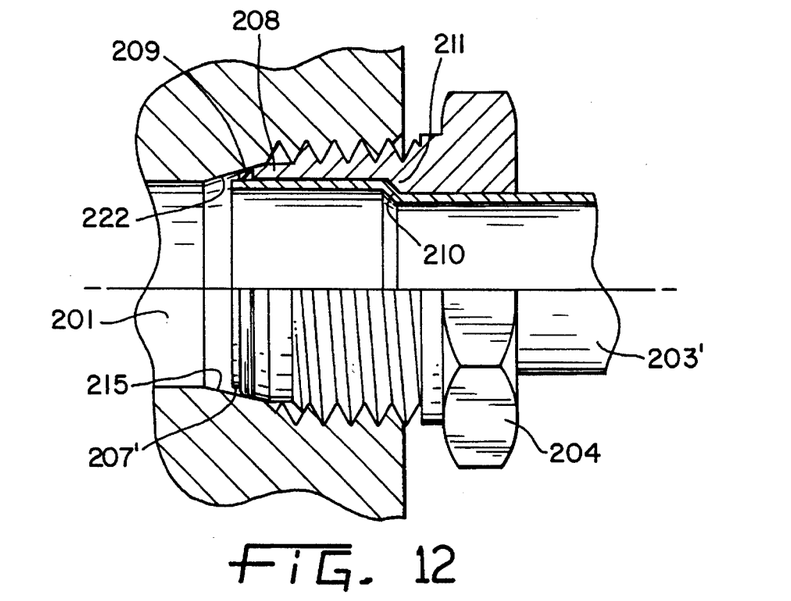
FIG. 12 is a side view, in partial cross-section, of a second embodiment of the tube-to-port coupling.

FIG. 12 shows another embodiment of the tube-to-port coupling. In the depicted embodiment, tube 203' does not include a lip, rather, expanded portion 207' extends into port 201 and provides a seating surface for o-ring 209. This design is advantageous where attachment of tube 203' to port 201 is desired to be done by only manual tightening of nut 204. Expanded portion 207 does not extend to contact tapered surface 215, but nut 204 presses o-ring 209 into sealing contact with tapered surface 215.

Referring to FIG. 12, seals are formed by o-ring 209 and thin walled portion 208. As nut 204 has torque applied during assembly, thin wall 208 presses against o-ring 209 and thus forces o-ring 209 into sealing contact with tapered surface 215 of port 201 until a sealing contact is formed between thin wall 208 and expanded portion 207'. After assembly, this embodiment performs similarly to the embodiment shown in FIGS. 5–7 except that instead of a seal at 212 of FIG. 7, a gap 222 remains between expanded portion 207' and tapered surface 215.

The connector portions of the hydraulic couplings (i.e., nut 204 of the tube to port coupling and bolt 309 of the transverse coupling) are made of material such as mild steel, stainless steel, monel, titanium, aluminum, brass, and various machinable alloys as well as certain plastics such as resin polymer material. The conduit portions of the hydraulic coupling (i.e., tube 203 and body 304) are made of material such as copper, brass, mild steel, stainless steel, titanium, aluminum, and various malleable/machinable alloys as well as certain plastics such as resin polymer material. The angle of the tapered surfaces of the coupling interfaces (i.e., tapered surfaces 215 of the tube-to-port, 303 of the banjo port, and 307 of the banjo body portion) is in the range of 5° to 45°, more particularly in the range of 10° to 30°, and preferably about 15°.

Figure 13:
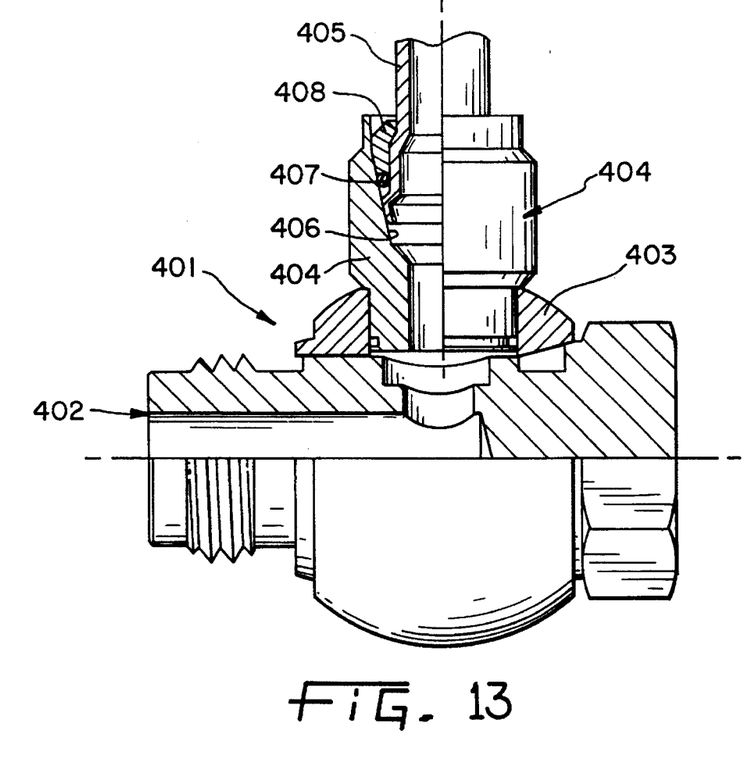
FIG. 13 is a side view, in partial cross-section, of a hydraulic coupling of the present invention previous to crimping.

In accordance with the present invention, FIG. 13 shows transverse coupling 401 previous to the crimping operation. Transverse coupling 401 includes bolt 402 and conduit body 403 which are similar to the transverse coupling of FIGS. 8–11. However, the present invention utilizes transverse port portion 404 to provide an attachment for transverse tube 405. Port portion 404 includes tapered surface 406 and may be formed integrally as part of conduit body 403, or alternatively may be separately formed then attached to conduit body 403, e.g., by brazing. However, such attachment may be accomplished previous to the crimping attachment of tube 405 to port portion 404. Tapered surface 406 receives the end of tube 405, sealing ring 407 (in the form of an o-ring), and compression ring 408.

Figure 14:
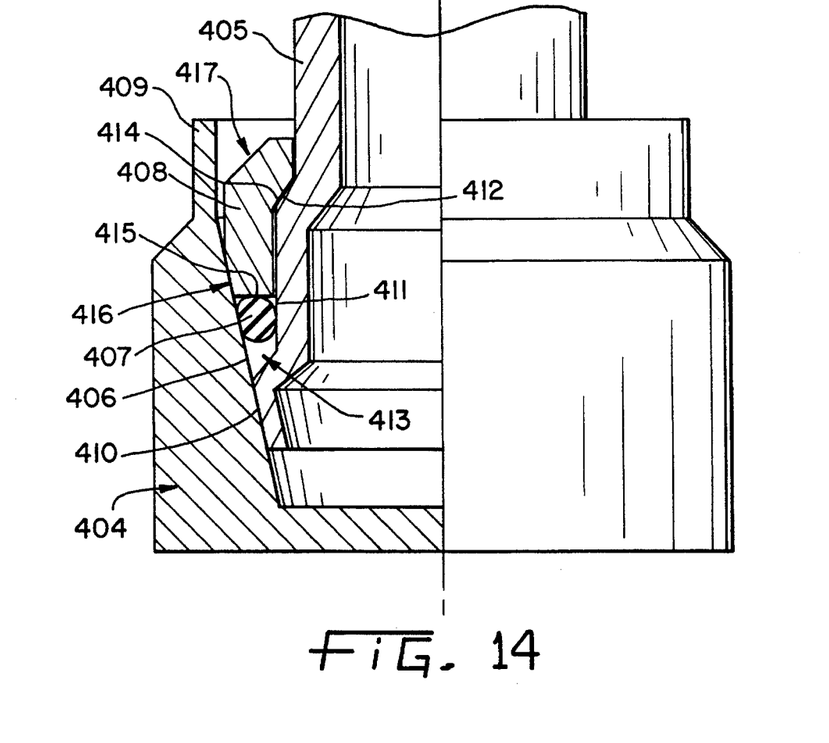
FIG. 14 is an enlarged cross-sectional view of the tube assembly previous to crimping.

As shown more particularly in FIG. 14, port portion 404 includes crimp collar 409 which extends beyond compression ring 408. Tube 405 has a specially formed end which includes tapered lip 410, seating portion 411, and tube upset 412. Tapered lip 410 has an outer surface which generally corresponds to the taper of tapered surface 406. Seating portion 411 is generally cylindrical and in conjunction with compression ring 408 and tapered surface 406 defines pocket 413. Pocket 413 is significantly larger in cross-sectional area than sealing ring 407 and provides a location for sealing ring 407. Seating portion 411 is expanded having a larger diameter than the non-banjo connected end of tube 405, with tube upset 412 being the portion connecting expanded seating portion 411 with the main portion of tube 405.

Compression ring 408 includes an annular body having end face 415 defining a boundary of pocket 413, tapered seat 416 generally corresponding to the taper of tapered surface 406, and reverse taper 417 for accommodating crimp collar 409 in the final assembly process. Tube upset 412 has an outer surface which is angled to correspond with internal angled seat 414 of compression ring 408 so that an additional seal may be formed between the outside of tube 405 and the inside of compression ring 408. Compression ring 408 may be made from material such as mild steel, stainless steel, monel, titanium, aluminum, brass, and various machinable alloys as well as certain plastics such as resin polymer material.

Figure 15:
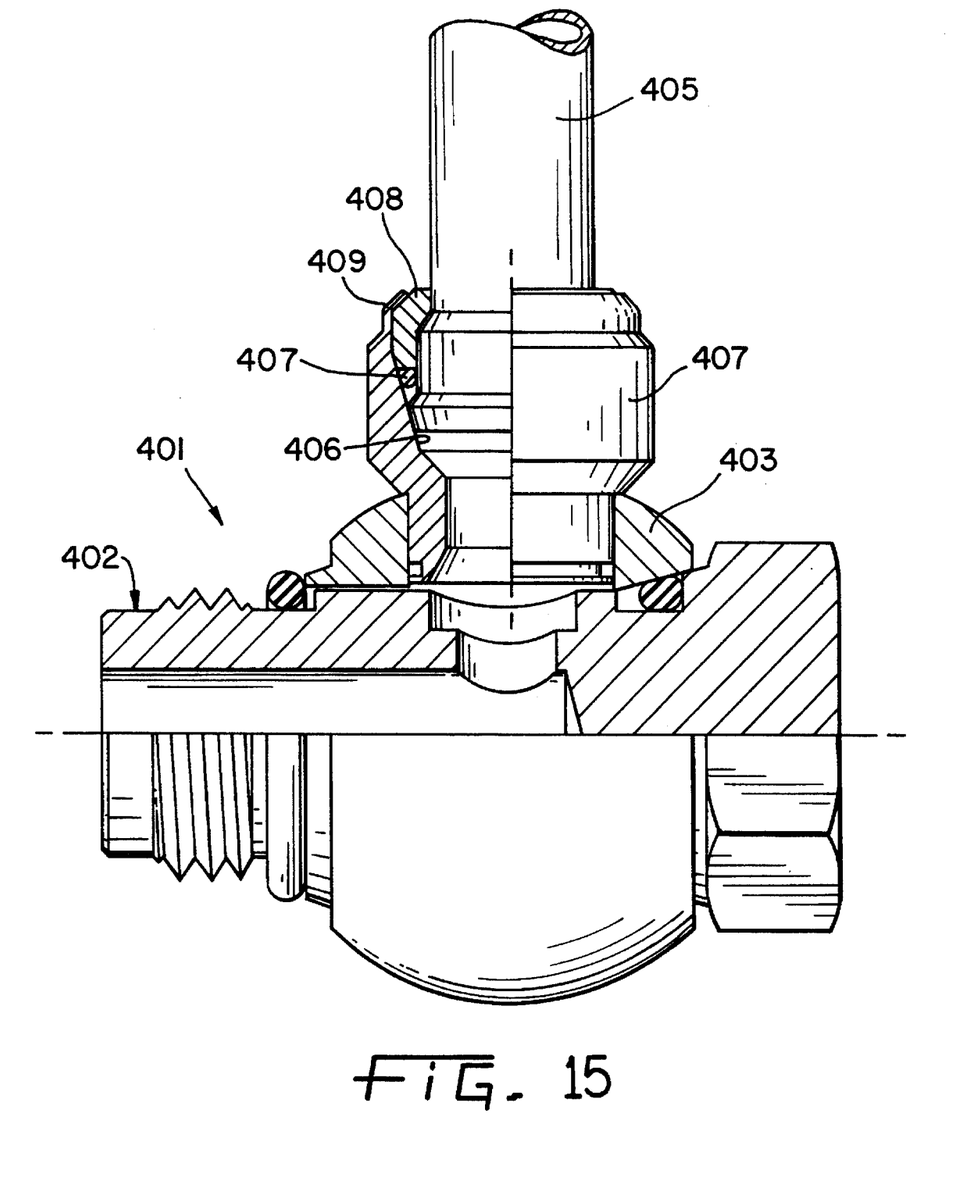
FIG. 15 is a side view, in partial cross-section, of the hydraulic coupling of FIG. 13 after crimping.
Figure 16:
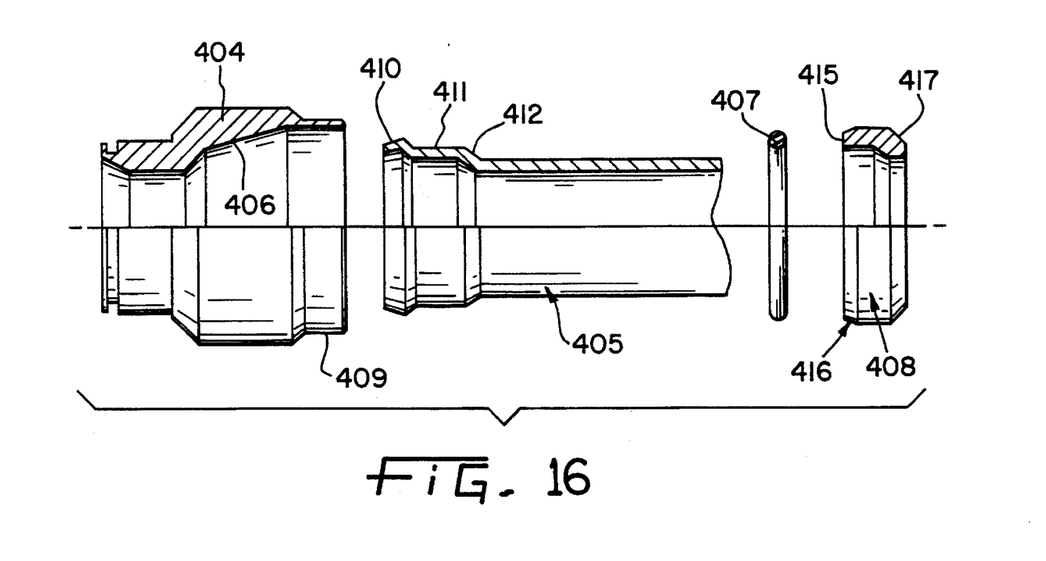
FIG. 16 is and exploded view, in partial cross-section, of the tube assembly of FIG. 13.

FIG. 15 shows collar 409 after being crimped over compression ring 408 by either a swaging, rolling, coining, or similar process. Collar 409 is pressed into reverse taper 417 to drive compression ring 408 between tapered surface 406 of port portion 404 and seating surface 411. This crimping of collar 409 creates metal-to-metal seals between: (1) tapered lip 410 of tube 405 and tapered surface 406 of port portion 404, (2) tapered seat 416 of compression ring 408 and tapered surface 406 of port portion 404, and (3) tube upset 412 of tube 405 and internal angled seat 414 of compression ring 408. Alternatively, compression ring 408 may first be assembled into port portion 404 prior to crimping collar 409. Further, sealing ring 407 is located in pocket 413 to provide an elastomeric secondary seal to respond to pressure differentials across the interface should the multiple metal-to-metal seals fail.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydraulic coupling comprising:

a port including an opening, a portion defining a passageway in communication with said opening, a collar disposed around said opening, and a tapered surface connecting said passageway and said opening;

a tube in fluid communication with said port, said tube including a lip at the end of said tube facing said port; and a compression ring disposed about said tube, said compression ring being made of a metallic material, said collar being deformed into said compression ring to sealingly bias said lip against said tapered surface of said port.

2. The hydraulic coupling of claim 1 wherein said compression ring includes a tapered seat which deforms into sealing contact with said tapered surface of said port.

3. The hydraulic coupling of claim 2 wherein said compression ring also deforms into sealing contact with said tube.

4. The hydraulic coupling of claim 2 further comprising a sealing ring, wherein said lip, said compression ring, and said tapered surface define a pocket, and said sealing ring is disposed within said pocket.

5. The hydraulic coupling of claim 3 further comprising a sealing ring, wherein said lip, said compression ring, and said tapered surface define a pocket, and said sealing ring is disposed within said pocket.

6. The hydraulic coupling of claim 4 wherein said pocket has a cross-sectional area larger than the cross-sectional area of said sealing ring.

7. The hydraulic coupling of claim 1 wherein said lip includes an outwardly facing tapered surface substantially complementary to said tapered surface of said port.

8. The hydraulic coupling of claim 1 wherein said compression ring comprises a machinable metal alloy.

9. The hydraulic coupling of claim 2 wherein said compression ring includes a reverse taper contacting said collar whereby said reverse taper facilitates said collar retaining said compression ring in a sealing contact with said tapered surface.

10. A hydraulic coupling comprising:

a port including an opening, a portion defining a passageway in communication with said opening, a collar disposed around said opening, and a tapered surface connecting said passageway and said opening;

a tube in fluid communication with said port; and a compression ring disposed about said tube, said compression ring including a tapered seat, said compression ring comprising a metallic material, said collar being deformed into said compression ring to sealingly bias said tapered seat against said tapered surface of said port.

11. The hydraulic coupling of claim 10 wherein said compression ring also deforms into sealing contact with said tube.

12. The hydraulic coupling of claim 10 wherein said tube includes a lip at the end of said tube facing said port, and said lip is also sealingly biased against said tapered surface of said port.

13. The hydraulic coupling of claim 10 further comprising a sealing ring, wherein said lip, said compression ring, and said tapered surface define a pocket, and said sealing ring is disposed within said pocket.

14. The hydraulic coupling of claim 13 wherein said pocket has a cross-sectional area larger than the cross-sectional area of said sealing ring.

15. The hydraulic coupling of claim 11 wherein said tube includes an outwardly facing tapered surface substantially complementary to said tapered surface of said port.

16. The hydraulic coupling of claim 10 wherein said compression ring comprises a machinable metal alloy.

17. The hydraulic coupling of claim 10 wherein said compression ring includes a reverse taper contacting said collar whereby said reverse taper facilitates said collar retaining said compression ring in a sealing contact with said tapered surface.

18. A hydraulic coupling comprising:

a port including an opening, a portion defining a passageway in communication with said opening, a collar disposed around said opening, a tapered surface connecting said passageway and said opening, said port including a body defining an axial chamber housing a bolt, and said bolt including a body with an axial bore and two annular projections;

said port, said bolt, and said annular projections defining an internal cavity, and said bolt including a hole located between said annular projections whereby a fluid flow path is provided from said channel to said internal cavity and through said hole and said bore of said bolt;

a tube in fluid communication with said port, said tube arranged as a transverse extension defining a channel transversely located in relation to said axial chamber, said axial chamber providing fluid communication between said bolt and said transverse channel; and connector means for sealingly securing said tube to said port, said collar being deformed into said connector means to sealingly bias said tube into said tapered surface.

19. The hydraulic coupling of claim 18 further comprising two sealing rings, wherein said bolt includes a first seating portion located between an end of said tube and an external threaded portion on a first end of said bolt, and a second seating portion located adjacent to said annular projections on a second end of said bolt, said sealing rings located on said first and second seating portions of said bolt.

* * * * *